United States Patent
Haartsen

(10) Patent No.: US 7,657,273 B2
(45) Date of Patent: Feb. 2, 2010

(54) METHOD AND APPARATUS FOR CALCULATING WHETHER POWER LEVEL IS SUFFICIENT FOR DATA TRANSFER

(75) Inventor: Jacobus Cornelis Haartsen, Hardenberg (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 10/550,840

(22) PCT Filed: Mar. 28, 2003

(86) PCT No.: PCT/IB03/01155

§ 371 (c)(1),
(2), (4) Date: Sep. 23, 2005

(87) PCT Pub. No.: WO2004/086736

PCT Pub. Date: Oct. 7, 2004

(65) Prior Publication Data

US 2007/0004466 A1    Jan. 4, 2007

(51) Int. Cl.
  H04L 12/58    (2006.01)
  H04M 1/725   (2006.01)
  H04W 24/00  (2006.01)
  H04B 7/00     (2006.01)

(52) U.S. Cl. .................. 455/522; 455/412.1; 455/412.2; 455/425

(58) Field of Classification Search .................. 455/425, 455/522, 412.1, 412.2
See application file for complete search history.

(56) References Cited

U.S. PATENT DOCUMENTS

| | | | | |
|---|---|---|---|---|
| 4,577,330 | A * | 3/1986 | Kavehrad | 375/235 |
| 4,910,468 | A * | 3/1990 | Ohtsuka et al. | 329/316 |
| 5,383,224 | A * | 1/1995 | Mizoguchi | 375/346 |
| 5,644,592 | A * | 7/1997 | Divsalar et al. | 375/147 |
| 5,760,740 | A * | 6/1998 | Blodgett | 342/362 |
| 5,838,740 | A * | 11/1998 | Kallman et al. | 375/346 |
| 6,535,666 | B1 * | 3/2003 | Dogan et al. | 385/31 |
| 6,597,750 | B1 * | 7/2003 | Knutson et al. | 375/347 |
| 7,047,040 | B2 * | 5/2006 | Kim et al. | 455/557 |
| 7,050,829 | B2 * | 5/2006 | Motohashi | 455/556.1 |
| 7,072,650 | B2 * | 7/2006 | Stanforth | 455/426.2 |
| 7,148,807 | B2 * | 12/2006 | Moro et al. | 340/636.1 |
| 7,150,402 | B2 * | 12/2006 | Chang | 235/472.02 |
| 7,151,807 | B2 * | 12/2006 | Chen | 375/329 |
| 2001/0011032 | A1 * | 8/2001 | Suzuki | 455/574 |

(Continued)

FOREIGN PATENT DOCUMENTS

EP    1 032 230 A    8/2000

(Continued)

Primary Examiner—Matthew D Anderson
Assistant Examiner—Bobbak Safaipour

(57) ABSTRACT

A method and apparatus for managing traffic in a network to and from a remote communications device with limited power supply resources. A controller determines the existing power level of the device and uses the determination to control data transmission to and from the device. Data may be transmitted and received by the device by determining the power required to complete a transmission or reception. The controller then determines whether to send the data, redirect the data, cancel the data transmission, or transmit only a portion of the data. The decision is made as to which option to choose based on the amount of power available to complete the data transmission.

24 Claims, 6 Drawing Sheets

U.S. PATENT DOCUMENTS

| | | | |
|---|---|---|---|
| 2001/0012774 A1* | 8/2001 | Muramatsu | 455/423 |
| 2002/0013143 A1* | 1/2002 | Lee et al. | 455/412 |
| 2003/0028601 A1* | 2/2003 | Rowe | 709/206 |
| 2005/0170853 A1* | 8/2005 | Verma et al. | 455/456.6 |
| 2005/0176449 A1* | 8/2005 | Cui et al. | 455/466 |
| 2006/0003741 A1* | 1/2006 | Becker et al. | 455/412.2 |
| 2006/0128448 A1* | 6/2006 | Lim | 455/575.3 |
| 2006/0153283 A1* | 7/2006 | Scharf et al. | 375/148 |
| 2006/0246887 A1* | 11/2006 | Barclay et al. | 455/423 |
| 2006/0264204 A1* | 11/2006 | Livingood | 455/412.2 |

FOREIGN PATENT DOCUMENTS

| | | |
|---|---|---|
| EP | 1032230 | 8/2000 |
| GB | 2 366 134 A | 2/2002 |
| GB | 2366134 | 2/2002 |
| WO | WO 99 43105 A | 8/1999 |
| WO | WO9943105 | 8/1999 |

* cited by examiner

METHOD AND APPARATUS FOR CALCULATING WHETHER POWER LEVEL IS SUFFICIENT FOR DATA TRANSFER

FIELD OF THE INVENTION

This invention relates to wireless and wireline communication systems. In particular, this invention relates to wireless and wireline communication systems and the status of power sources associated with the communication systems. Even more particularly, this invention relates to battery powered portable units, mobile units and units located where wiring for power supply is difficult or non-existent.

BACKGROUND OF THE INVENTION

There has been incredible progress in wireless communications in the last few decades. The economic growth and progress in worldwide prosperity has brought electronic and wireless applications into nearly everybody's reach. Cellular and mobile communications are a booming success. Portable devices, including mobile phones, can now be produced having acceptable cost, size and power consumption.

Mobile phone communications for the consumer market started with a phone system derived from the police and rescue services and was based on an analog technology improved and optimized in the seventies and eighties. These systems led to the first analog phone systems for public usage such as Advanced Mobile Phone Service (AMPS), Nordic Mobile Telephone (NMT) and Total Access Communications Systems (TACS). The usage of mobile phones really took off in the nineties with the introduction of mobile phone systems based on digital technology like Global System for Mobile Communications (GSM), Digital Advanced Mobile Phone Service (D-AMPS) and Personal Digital Cellular (PDC). Although radio technology is focused mainly on voice communications (with respect to handheld radios) data services grow in importance and eventually a mobile Internet will be established.

New systems based on packet data transmission are already planned and some are being deployed. Examples are GPRS (General Packet Radio Service) and UMTS (Universal Mobile Telephone System). Whereas cellular systems address wide area coverage, providing national services anywhere, other systems have been designed to give more localized services such as in an office or a residence. Today, indoor systems based on the WLAN IEEE 802.11 standard are widely deployed to provide high data-rate access in restricted areas. A competing system called HIPERLAN (High PERfomance LAN) has been designed to complement the cellular systems like UMTS by providing high capacity and high data rates to slowly moving users in hotspot areas. For the cordless telephony at home, DECT (Digitally-Enhanced Cordless Telephony) has been standardized and is widely used in households in Europe.

Recently, a new air interface called Bluetooth was introduced to replace all cables between mobile phones, laptop computers, headsets, PDAs, and so on. An introduction to the Bluetooth system can be found in "BLUETOOTH—The universal radio interface for ad hoc, wireless connectivity," by J. C. Haartsen, Ericsson Review No. 3, 1998. Radio communication systems for personal usage differ importantly from radio systems like the public mobile phone network. In the latter systems, a licensed band is used which is fully controlled by the phone operator and procedures are implemented to guarantee an interference free channel. In contrast, personal radio communication equipment has to operate in an unlicensed band and has to deal with uncontrolled interference. A suitable band is the ISM (Industrial, Scientific and Medical) band at 2.45 GHz, which is globally available and provides 83.5 MHz of radio spectrum.

Bluetooth is a frequency hopping system which hops over 79 hop carriers in the ISM band with a nominal hop rate of 1600 hops/s. Bluetooth deploys a slotted channel with time slots of 625 μs. Each slot uses a different hop carrier selected according to a pseudo-random hopping scheme. Bluetooth radio communications are based on peer communications and ad-hoc networking. This means that the system is not based on a hierarchical scheme with fixed infrastructure of base stations and portable terminals that communicate with the base stations via radio signals as is common in cellular systems and WLAN systems. In peer communications, all units are equal. There is no centralized control that can for example take care of resource and connection management and provide other support services.

In ad-hoc networks, any unit can establish a connection to any other unit in range. Ad-hoc networks are usually based on peer communications. To support the cable replacement scenarios as mentioned above, data traffic over a radio interface must be very flexible. The interface must support both symmetric and asymmetric (in either direction) traffic flows and synchronous and asynchronous services. In Bluetooth, this has been realized with a very flexible slot structure without any multi-slot frames or anything alike. The time axis in Bluetooth is divided into slots, and the connected units are free to allocate the slots for transmission or reception.

Advances in wireless technology and the growing demand for more flexible applications provided by wireless communications makes it highly likely that this field will expand to provide greater information flow to and from other types of portable devices and fixed access points. More specifically, it is lil<ely that further advances in technology will provide very inexpensive radio equipment, which can be easily integrated into many devices. This will reduce the number of cables currently used and vastly expand the usage possibilities. However, large deployments of wireless applications would not have been possible without large improvements in battery technology.

Size reduction and capacity increase in batteries have tried to keep pace with the size reduction and intensified processing in the wireless terminals. However, developments towards higher data rates and mobile services that require more intense data exchange as well as more advanced user presentation (like video) will put great pressure on the power supply provided by the batteries. In wireless systems, data rate and power consumption are different parameters of the same equation. In all wireless communication systems, power management functions are present to keep the power consumption to a minimum, leaving as much standby and talk time for the user as possible. It would be desirable to provide the status of a receivers battery to a connected wireless system so as to optimize and improve the operation of the user's wireless terminal.

Wireless communication devices are attractive because of the freedom of movement they offer. However, this also means that the unit will be dependent upon batteries for power supply. Wireless applications are seen more and more as a replacement of the wired application, thus putting greater demands on transfer capacity and power consumption. Unfortunately, the progress in advanced wireless applications is moving forward more quickly than the advances in battery technology. Therefore, research is taking place to look for other energy resources like fuel cells.

In general, radio protocols include features that take into account the limited power resources in the mobile terminals. For example, in cordless and cellular phone systems, low power modes are defined that keep the units locked to a beacon or control channel at a low duty cycle when there is no voice connection. In general, these power management functions try to keep the current drawn from the battery as low as possible.

There are various examples of methods to monitor and conserve battery power in wireless devices. For instance, U.S. Pat. No. 6,459,896 issued to Liebenow et al., discloses a system and method for notifying a remote device of a low battery condition in a wireless communications system. A wireless, battery operated device may be attached to a network with a battery monitor installed in the wireless device. If the battery discharges to a predetermined power level, without corrective action being taken, the battery monitor sends notification of the power level to a remote device. This notification may be a warning to the user of the remote device that the connection to the wireless device cannot be maintained due to low power level. The warning may be a pre-recorded announcement.

U.S. Pat. No. 6,108,316 issued to Agrawal et al., discloses a method for adapting scheduling priorities to conserve battery power in mobile terminals within a wireless communication system. A scheduling method is disclosed wherein a base station receives a signal from a mobile terminal that the terminal's battery level is below a predetermined threshold. The Base station may reschedule transmissions to the mobile so that messages may have a higher probability of successful transmission before the battery power level diminished further.

Most, if not all, battery-driven equipment today has some method or apparatus of determining the battery or power source status of the equipment. The above prior art examples relate to monitoring a wireless device battery and either notifying the device holder of a low battery condition or scheduling transmissions to attempt to transmit a complete message before the device battery expires. However, either example may allow a device to send a message that may not be completed. There is therefore a need in the art for a method and apparatus in a wireless communication system to account for the power supply status of the (mobile) devices in the system. In other words, there is a need to manage traffic flows based on known power supply levels in the system.

SUMMARY OF THE INVENTION

To address the above-discussed deficiencies of the prior art, it is a primary objective of the present invention to provide a method and apparatus for managing a communication device power source for use in a network. A controller coupled to the network and the device determines the existing power level of the device's power source (battery). The controller uses the information to control data transmission to and from the device while taking into account the power level of the power source. Data may be transmitted and received by the device by determining the power available to complete a transmission or reception. The controller then determines whether to transfer the data to the target, redirect the data, cancel the data transmission or transfer only a portion of the data (to or from the communication device)

When a communication device is initially connected to a network, information regarding the device's power source and the manner in which the device drains power when in operation may be passed to a controller. This information is periodically updated. During an active connection, the current state of the device's power source is determined and the device or the controller may calculate the drain rate of the power source as related to the services available and that the device is capable of handling.

When an incoming call (or outgoing call from the device) to the device is detected the size of the data to be transferred is determined. A calculation is made to determine how much data may be transferred using the currently available power. Actions that may be taken by the present invention include: sending the complete transmission to a destination, sending a portion of the transmission to the destination and the remainder to a predetermined address and re-directing the entire transmission to a network address. When a data is re-directed to an alternate address, a notification is sent to the recipient describing the actions taken.

Status of the power supply in each of the participating units in the network is determined. Based on the battery status of one unit, different actions in the network may take place. For example, the status of the power levels can influence traffic scheduling in the network. In a cellular system, a central controller in the network can inform the mobile user that the current power level of the mobile phone's battery is insufficient to support a requested service. For instance, a connection is established between a user and a mobile unit for receiving a 1 MByte data file. The current battery level may be too low to complete the entire transmission. If a control unit in the mobile network knows the battery status, the file transfer may be diverted to a mailbox in the network rather than send it over the air to the mobile unit. Simultaneously, it may signal to the mobile user that a file is waiting, but that the battery level is too low to support downloading the complete file.

The type of information sent to a mobile unit may also depend on its battery status. For example, a PDA connects wirelessly to a Wireless Local Area Network (WLAN) to check Email. If the PDA battery power level is low only the Email headings are sent. Attachments and content of the email are kept within the central mailbox. The user is notified that attachments are waiting but the battery has to be charged before more information can be retrieved.

In another embodiment, a large number of sensors may be connected wirelessly to a master control unit. This master unit polls the sensors at a very low duty cycle to obtain sensor readings. In these readings, the sensor may include the current battery status. If the battery is too low (for example to supply more readings, or to remain in standby until the next poll event), the master unit may signal an alarm or other indication to replace or recharge the battery in that particular sensor.

In a peer-to-peer link as in Bluetooth connected devices, the battery status of one unit may affect the behavior of another unit. For example, if a headset that is paired to a mobile phone has a battery level that is still sufficient to support the standby mode but not sufficient to support the talk mode, an incoming call may be directed to the speaker/microphone in the mobile phone rather than to the headset.

In an additional embodiment of the present invention the quality of service offered to the mobile user may depend on the mobile's battery power level. For example, the power level may be sufficient to support either a 64 kb/s toll-quality speech connection for 10 seconds, or an 8 kb/s acceptable speech connection for 2 minutes. The system may select the latter as it will better serve the user under these conditions.

Future wireless systems will provide multi-media messaging. These messages may include voice, music, video, and more. Based on the battery level in the receiving device, the wireless system may decide to send only part of the message. For example, it may only send the voice message but not the video. It may indicate that an accompanying video is waiting but the battery has to be replaced or recharged before this video can be downloaded.

In the present invention, the battery power level of the mobile as well as the power drain for the requested service is determined. In particular, a controller knows the power consumption per bit of transmitted or received data. With the power drain per bit and the battery level, it can be derived how many bits can still be received, or alternatively, how long a service with a certain bit rate can be provided. The power consumption per bit may be dependent on the modulation mode (e.g. GSM or EDGE modulation) in the case of a mobile unit in a wireless network. The information about power drain per bit may be communicated to the network once (the controller may include a record with the unit's ID, characteristics, features, and also the power consumption per mode). In addition, the current battery status and/or the power drain may also be communicated with regular updates since the power drain rate may change over time. Alternatively, the receiver can calculate the total number of bits it can receive based on the current battery power level and power drain and communicate that number to the controller.

In general, battery management as disclosed in the present invention will prevent loss of connection in the middle of a transaction. Anticipating battery power levels will improve the user experience. By blocking a connection in the beginning and implementing alternatives for as long as the battery level is low is better than being disconnected during the transaction due to loss of battery power.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The disclosed invention will be described with reference to the accompanying drawings, which show important exemplary embodiments of the invention and which are incorporated in the specification hereof by reference, wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features or embodiment(s) but not to others.

Figure 1:
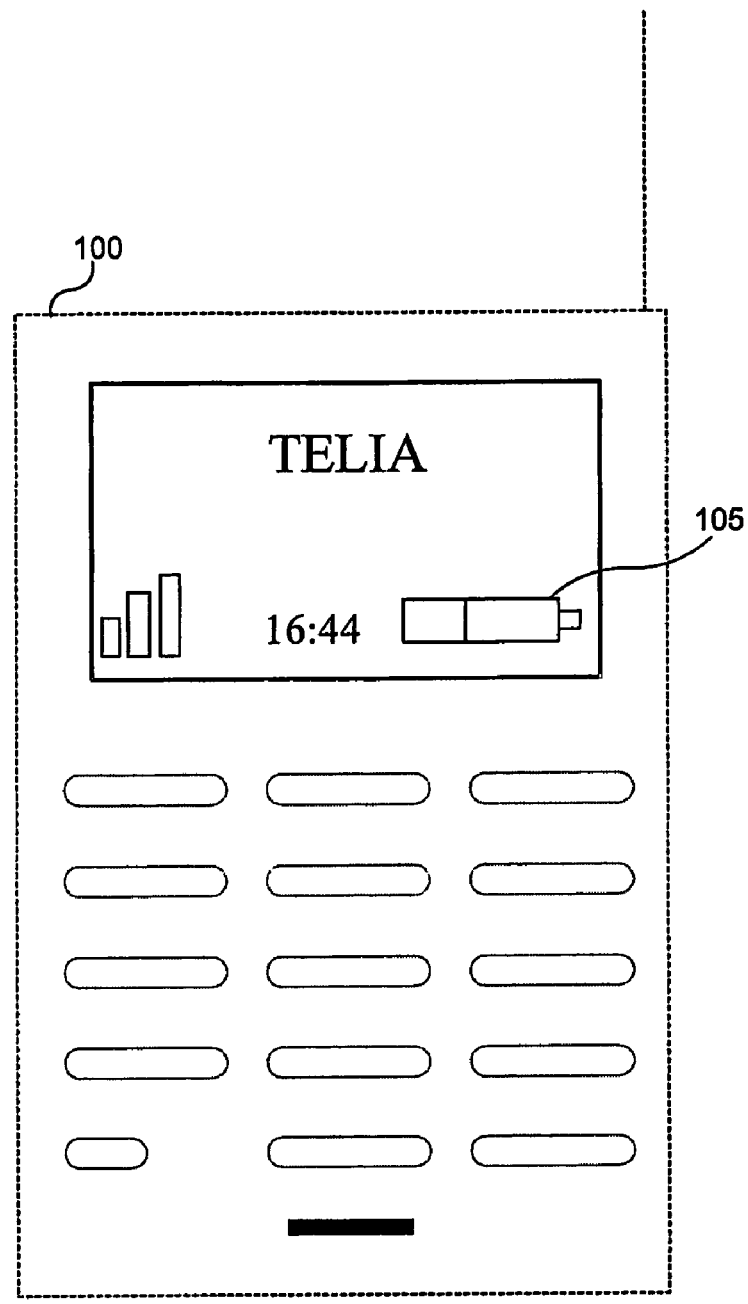
FIG. 1 depicts a mobile phone display with battery indication (prior art)

In FIG. 1, the display of a mobile phone is shown with a battery level indicator in the lower right corner. Battery indicator 105 shows the power level of the battery (not shown). When the power level of the battery is very low the phone may sound an audible signal or maybe initiate a flashing light that alarms the user who can then replace or re-charge the battery. However, the power drain on the battery is different for different services. For example, a phone with a full battery may have a 7-day standby time or a 4 hours talk time. If the battery is 5% filled, mobile phone 100 can remain in standby for another 8 hours. However, when accepting a call during this time frame, the duration of the voice connection quickly drops to 12 minutes or less. With more demanding services like video and multi-media messages, the imbalance becomes even larger. As a result, communications may be disrupted in the middle of a transaction since the battery level may have been adequate when transmission started, but was not high enough to support the entire transaction.

A battery management function is disclosed that takes into account a power level of the battery and the expected power drain in the battery accompanying the service provided or requested. In the present invention, the power level status of the battery is not only known inside the terminal in which the battery is residing (as in the phone in FIG. 1), but may be communicated wirelessly to a control center in the network and to other wireless units connected to the network. Obviously, in the case of a wireless network, the power level status may be communicated wirelessly.

Figure 2:
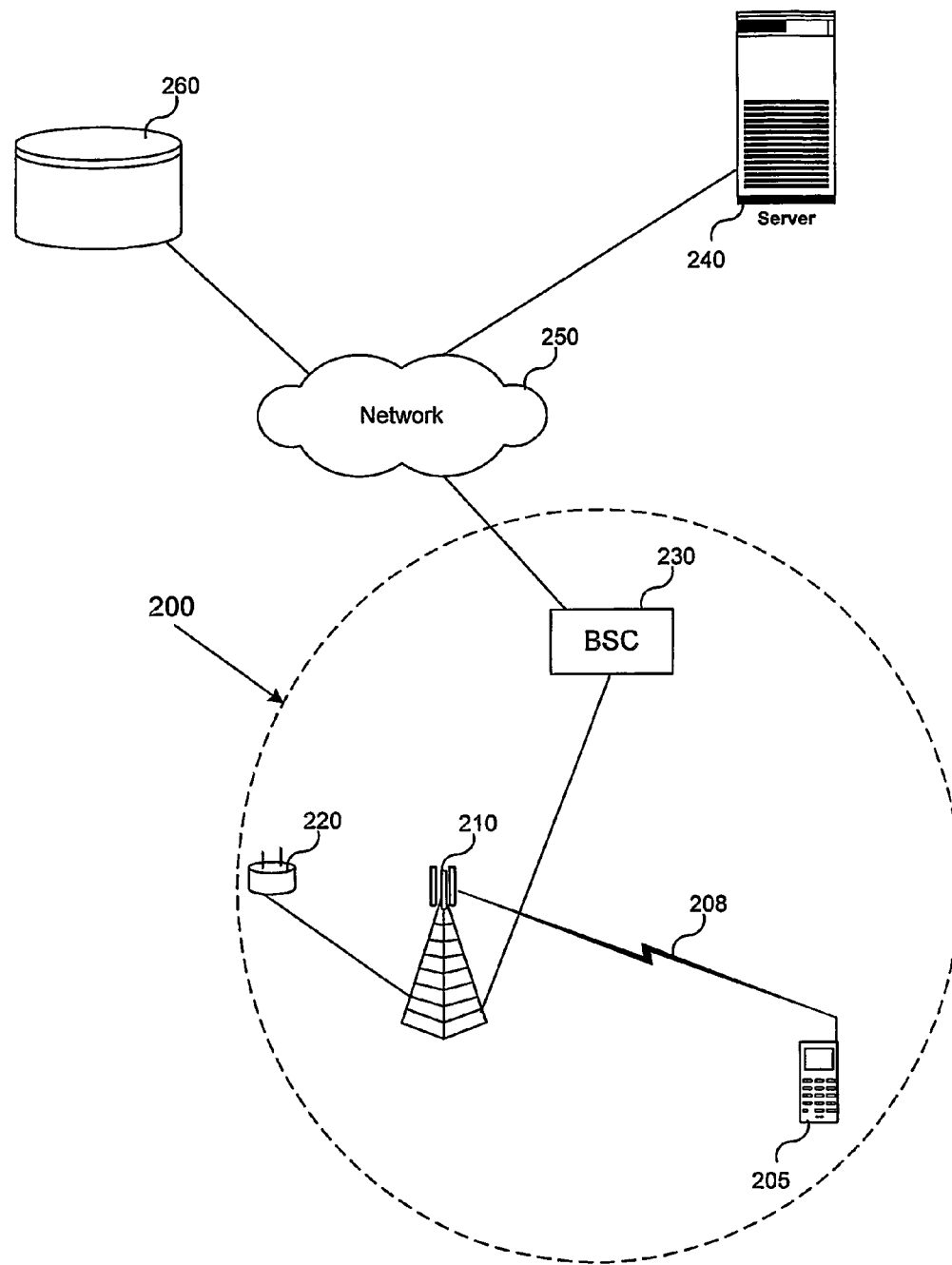
FIG. 2 illustrates a cellular phone system utilizing battery management in accordance with the present invention.

FIG. 2 illustrates a cellular phone system utilizing battery management according to the present invention. Cellular system 200 includes macro-cellular base station 210, micro-cell base station 220, base station controller (BSC) 230, server 240 and terminal 205. As illustrated, terminal 205 is out of the range of micro-cell base station 220 and is locked in standby or idle mode to base station 210 via cellular link 208. A multimedia (MM) message with voice and video content may be sent from network 250 to terminal 205. Terminal 205 is assigned to a traffic channel.

Prior to beginning any transaction, terminal 205 reports its battery status to BSC 230. Based on the battery status report, BSC 230 will make a choice: if the battery status is high, BSC 230 will forward the MM message to terminal 205 or if the battery status is really low, BSC 230 will divert the MM message to a mailbox for terminal 205. Simultaneously, a short-message-service (SMS) message is sent to terminal 205 to announce that an MM message is available in the network but that the battery is too low to allow delivery. However, the battery level may be high enough to only send the voice content of the message. BSC 230 may then send the voice content of the message to terminal 205 and divert the video content to the mailbox of the user.

In another example, terminal 205 may need to transmit an Email message via communications network 200. Terminal 205 contacts base station 210 for a traffic channel. Based on the 1) size of the Email message, 2) the transmit power required to overcome path loss between base station 210 and terminal 205, and 3) the battery status, terminal 205 and/or base station 210 may decide to postpone transmission. Preferably, network 200 (e.g. in the BSC or some other control unit) utilizes all this information to make a decision. When terminal 205 moves into the direction of micro-cell base station 220, the idle connection between terminal 205 and base station 210 is handed over to micro-cell base station 220. BSC 230, recognizing that terminal 205 is now connected to the micro-cell base station with a much shorter range, may allocate a traffic channel between micro-cell base station 220 and terminal 205 to transfer the email. Since the distance is much smaller and path loss is lower, the battery level may be sufficient to effect complete transfer of the Email message. The user is of course not involved in this activity as it happens in the background.

In addition to battery level, terminal 205 may provide the anticipated power drain (either per bit or per second) for the considered service. This power drain may be constant (e.g. for terminals without transmit power control and a fixed modulation format) in which case terminal 205 only has to communicate once to network 200. This type of information may be stored in database 260 where a record is kept of the terminal equipment that is connected to network 200. For example, each record may be labeled by the IMEI (International Mobile Equipment Identity) or some other serial number associated with terminal 205. The record can further include services, modes and additional features that terminal 205 can support. The power drain per mode can also be incorporated in this record. Alternatively, at connection establishment, terminal 205 can directly provide the server with information about the amount of data that can be transferred or the service time that is supported by the current battery status.

The power drain may also change over time. For example, when terminal 205 is communicating with BSC 230, terminal 205 may move away from BSC 230. Cellular systems usually include power control to compensate for the increase in signal attenuation. Consequently, terminal 205 will be ordered to increase transmit power resulting in an increased power drain. An update of the power drain can, for example, be signaled to BSC 230 via the slow-associated control channel (SACCH), which may result in further actions in the network to optimize the traffic flow.

In the example above, terminal 205 may be located in a macro-cell at quite a distance from the base station. Transmit power of terminal 205 may be controlled at 200 milliwatts (mW) for acceptable reception by the base station. The current drain to support a 50 kilobits per second (kb/s) GPRS uplink connection is 100 mA. The current battery level of terminal 205 is at 10 mAh. Therefore this service can be maintained for six minutes, or the amount of data that can be transferred is 2.25 megabytes (MB). If a 10 MB file has to be transferred, terminal 205 may decide to wait before submitting the file to the network. When terminal 205 moves within reach of micro-cell base station 220, it may reduce the transmit power of terminal 205 to 10 mW. The current drain to support a 50 kb/s GPRS uplink connection then becomes 10 mA. As a result, the battery, level is sufficient to support the transfer of a 22.5 MB file and more than sufficient to send the 10 MB file to the network.

Figure 3:
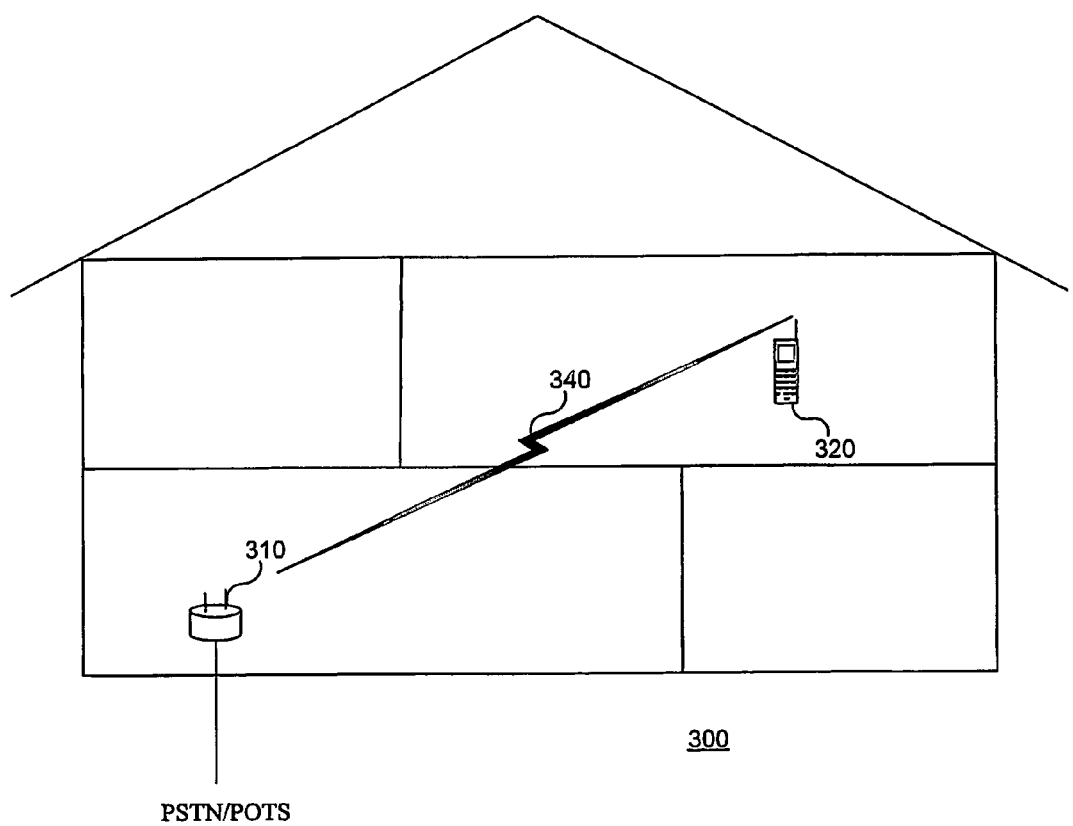
FIG. 3 depicts a cordless phone system including battery management according to the present invention.

FIG. 3 depicts a cordless phone system including battery management according to the present invention. Cordless system 300 is shown with base station 310 and voice terminal 320. Air interface 340 supports different voice coding schemes ranging from 64 kb/s Pulse Code Modulation (PCM) to 4 kb/s Code Excited Linear Prediction (CELP). In this example, the battery is a 600 milli-ampere-hour (mAh) battery which is 10% charged (60 mAh). For the 64 kb/s transmit mode, the terminal drains 100 mA whereas for the low rate 4 kb/s transmit mode, the current drain is only 10 mA. When a call is made, initially the 64 kb/s mode is used for perfect speech quality. However, the perfect speech quality mode can only be sustained for 36 minutes before the battery is empty. Talk time may be extended by switching to a lower (but lower quality) rate by gradually reducing the transmission rate (say from 64 kb/s to 32, to 16, 8 and 4 kb/s). For instance, terminal 320 only has 64 kb/s and 4 kb/s modes. If after 30 minutes in the 64 kb/s mode the connection is still on, the system may switch to the 4 kb/s mode for the uplink. Instead of having 6 minutes left, the phone can be used for another hour albeit with a lower speech quality in the uplink.

Figure 4:
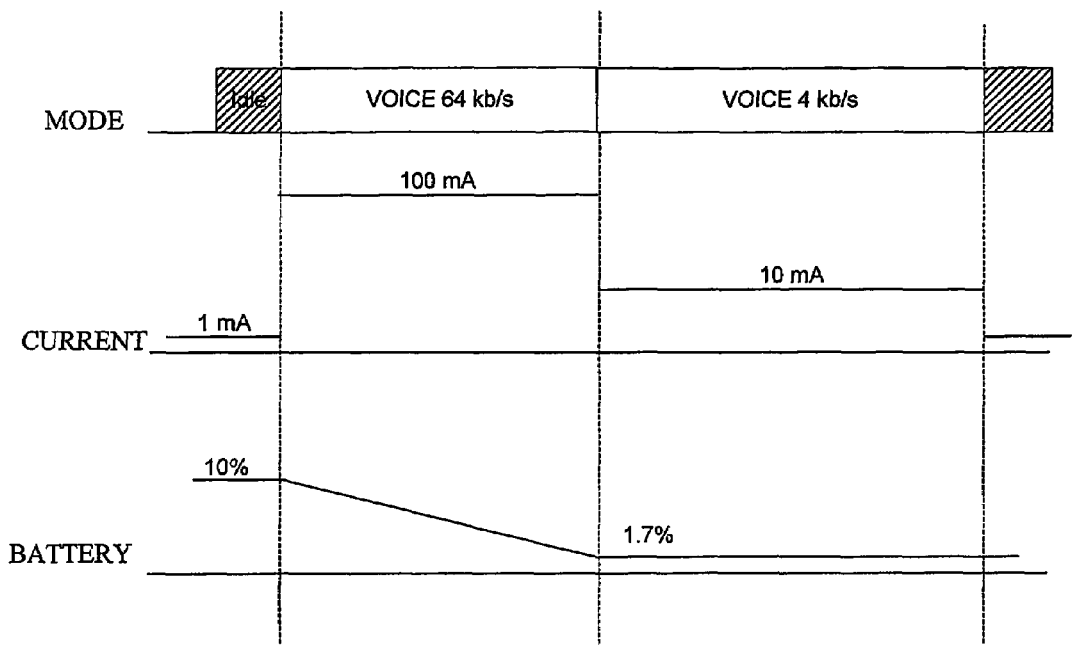
FIG. 4 illustrates a timing diagram of parameters encountered in cordless phone operation as depicted in FIG. 3.

FIG. 4 illustrates a timing diagram of parameters encountered in cordless phone operation as depicted in FIG. 3. In FIG. 4, the events in time are shown. When the battery is only 1.7% charged, it switches to a mode with less current drain. As part of the connection setup, the terminal may communicate the following record to the base station (values in the table below are given as example):

| | |
|---|---|
| current battery level | 60 mAh |
| power drain 64 kb/s mode | 100 mA |
| power drain 4 kb/s mode | 10 mA |

Base station 310 may then decide when to switch modes in order to extend the service time at the expense of the voice quality.

Figure 5:
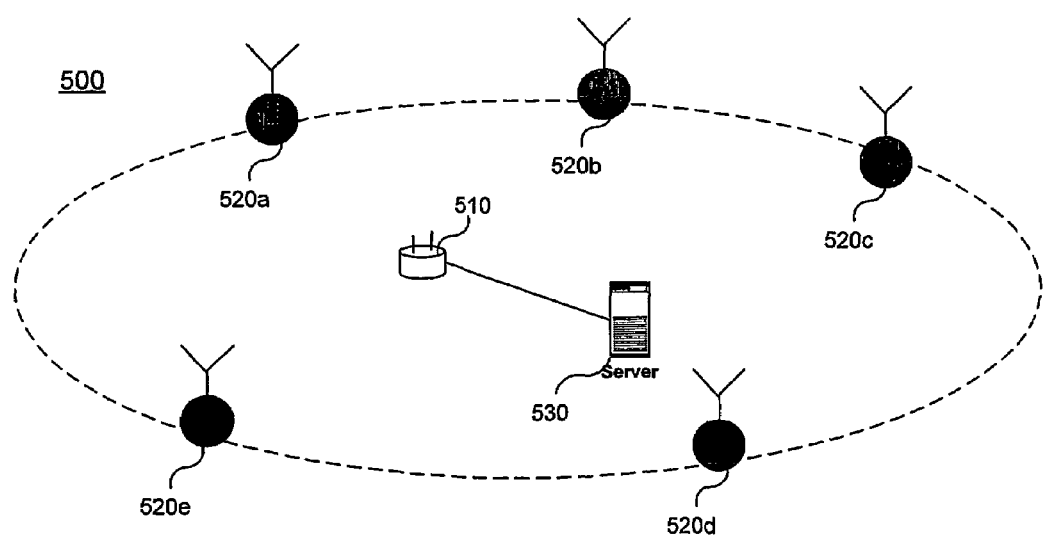
FIG. 5 depicts a sensor system with battery management according to the present invention.

FIG. 5 depicts a remote sensor system with battery management according to the present invention. A wireless telemetry system 500 is shown which includes central master 510 that connects to sensors 520a-e distributed in a manufacturing hall. A battery is connected to each one of sensors 520a-e to provide operating power. Periodically, central master 510 wirelessly activates sensors 520a-e to retrieve some readings like temperature, humidity, and so on. In addition to these readings, sensors 520a-e report battery status. If one of the sensors reports a low battery, central master 510 can activate another sensor to take over the operation of first sensor. Additionally, central master 510 can signal or alarm a unit to be checked by maintenance. Maintenance can then replace the battery of the considered sensor before the sensor has lost contact with central master 510.

Figure 6:
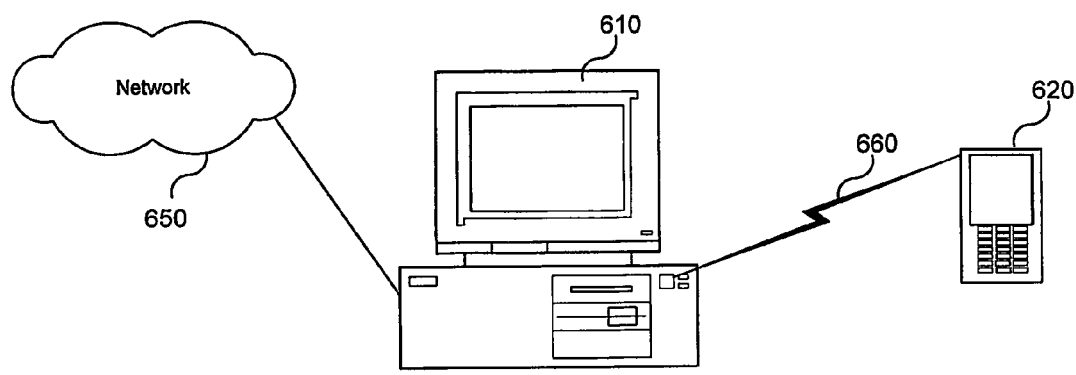
FIG. 6 illustrates a Bluetooth connection between PC and PDA with battery management according to the present invention.

FIG. 6 illustrates a Bluetooth connection between a Personal Computer (PC) and a Personal Digital Assistant (PDA) with battery management, according to the present invention. PC 610 and PDA 620 are shown as being in contact with each other via Bluetooth link 660. When coming into each other's range, PC 610 and PDA 620 try to synchronize a mailbox. PC 610 is permanently connected to network 650 and has received many new mail items. To prevent aborting data exchange in the middle of synchronization because of a depleted battery in PDA 620, PC 610 first checks battery status of PDA 620 by requesting a battery status report from PDA 620 via Bluetooth link 660. Additionally, PDA 620 may indicate its power drain when supporting a Bluetooth connection. If the battery is okay, synchronization can commence. If the battery is too low to support the entire synchronization session, PC 610 may choose not to start synchronization, but instead send a message to PDA 620 that the PC 610 battery is too low to support this synchronization service (although it may be high enough to support some other, less demanding functions). Alternatively, battery status may be sufficient just to send the headers and subject fields of the Email messages but not the bodies and attachments.

Figure 7:
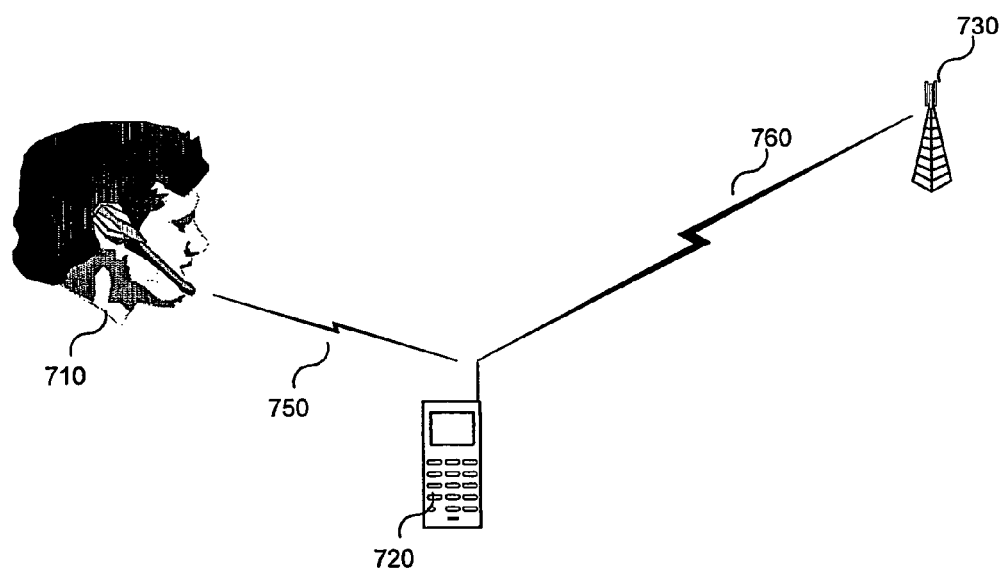
FIG. 7 depicts a Bluetooth connection between a mobile phone and a paired headset with battery management according to the present invention.

FIG. 7 depicts a Bluetooth connection between a mobile phone and a paired headset with battery management, according to the present invention. Mobile phone 720 and a headset 710 is connected via Bluetooth link 750. Mobile phone 720 is wirelessly connected to a mobile network (not shown) via cellular link 760 and is locked to base station 730. The battery of headset 710 is 10% charged. This level may be enough to support a voice connection for 30 minutes. However, if MP3 audio files are to be transmitted to headset 710, only 5 minutes can be supported in the headset. Depending on the service requested by the user, mobile phone 720 may deny services because of a low battery level in headset 710. Alternatively, the display in mobile phone 720 may show the battery level of headset 710 in addition to the mobile phone 720 battery level. In that case, headset 710 reports battery status periodically to mobile phone 720. In a wireless personal area network established with Bluetooth, the status of all the batteries in the network can be communicated between all units in the network. This information can be displayed on each unit, but can also be used to schedule traffic flows and make decisions which modes are most appropriate to serve the user in an optimal way.

Power drain in similar devices will differ from manufacturer to manufacturer. Power drain information can be downloaded or flashed into the terminal (if transmit power control is applied, a look-up table may be used with different entries for different transmit power levels). Alternatively, the terminal can learn automatically while in service what the drain per mode will be. All the information like transmit battery status (change), transmit power level, operational mode, and duration of operation can be communicated to the operating system of the terminal. From this information, the terminal can derive the power drain for each operation.

Figure 8:
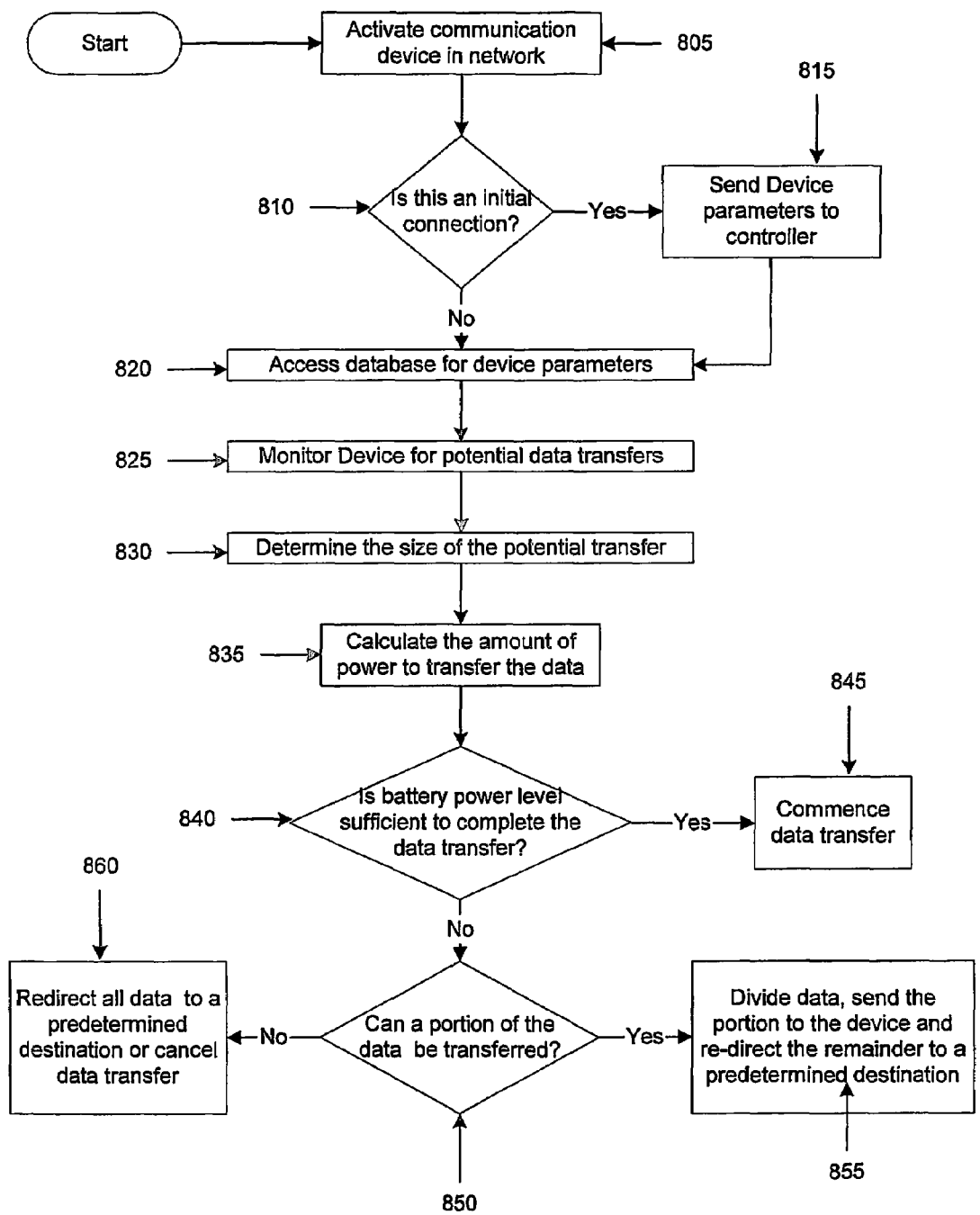
FIG. 8 illustrates a method for managing a communication device power source in a network according to a preferred embodiment of the present invention.

FIG. 8 illustrates a method for managing a communication device power source in a network according to a preferred embodiment of the present invention. The process begins at step 805, which depicts connecting, or activating, a communications device to a network. The communications device may be a mobile phone in a wireless network, a cordless phone set connected to a PSTN, a remote battery powered sensor, a Personal Digital Assistant connected to a network through a computer, a mobile phone and Bluetooth headset connected to a wireless network, or any other equivalent device and network.

For the purpose of explanation and description the communication device will be a mobile phone connected to a wireless network and the power supply is the mobile phone battery. When connecting to a network (Step 810) a controller may query the mobile phone to determine the parameters regarding the power level of the mobile phone's battery and the power consumption of the services to which the mobile phone may be subscribed. (Step 815) If the phone is reconnecting to the network, the parameters may already be stored and the controller then retrieves the parameters to apply to any transactions that take place between the phone and the network (Step 820). The phone is monitored for any data transfers that may take place between the phone and the network (Step 825).

If a data transfer is scheduled or requested, the size of the data to be transferred is determined. In the case of a voice transmission, the controller determines the battery power level and sets the appropriate quality of service (QoS). The power level is monitored and the QoS is adjusted to accommodate the remaining power in the battery. This determination may be made by the network controller or by the phone (Step 830). The current power drain of the battery for the phone and the amount of remaining power is calculated. The amount of data to be transferred and the power drain relating to the type and amount of data to be transferred is also determined. The amount of power required to transfer the data is then calculated (Step 835).

A determination is then made whether the battery power level is sufficient to make the complete data transfer (Step 840). If so, the data transfer is commenced (Step 845). If not, a determination is then made if a portion of the data can be transferred (Step 850). If the data can be divided, a portion is sent to the phone and the remainder is then sent to a predetermined destination. An automatic message is also sent to the device indicating the actions taken and the address that the phone may access to retrieve the balance of the message (Step 855).

If the determination is made that the data either cannot be divided or the battery power level cannot support a complete transfer, the complete message may be re-directed to a pre-determined destination and an automatic message is then sent to the device (step 860).

As will be recognized by those skilled in the art, the innovative concepts described in the present application can be modified and varied over a wide range of applications without departing from the spirit and scope of the invention in its broadest form. Accordingly, the scope of patented subject matter should not be limited to any of the specific exemplary teachings discussed, but is instead defined by the following claims.

What is claimed is:

1. A method for managing traffic in a network, involving a communication device with a limited power supply, comprising: determining a current level of available power in said power supply for transmitting and receiving functions of said communication device;

communicating said power level to a controller;

determining a current power drain rate of said power supply detecting a need for data transfer associated with said communication device, wherein said data transfer is an incoming call to said communication device or a request for transmission from said communication device;

determining a quantity of data relating to said data transfer;

calculating whether said power level is sufficient to effect the transfer of said quantity of data;

wherein a quality of service level provided to the communication device in the network is changed in response to said power level calculations; and if said power level and said power drain rate are sufficient to transfer said quantity of data, said controller commencing the transfer of said quantity of data to the communication device, wherein if said power level and said power drain rate are not sufficient, transferring a portion of said quantity of data to the communication device and transferring the remainder of said quantity of data to a predetermined destination, the address of which is sent to the communication device for retrieving the remainder of said quantity of data.

2. The method of claim 1, further comprising:
storing initial parameters for said power supply of said communication device and periodically updating said power supply parameters, wherein said parameters include:
a drain rate for each communication service available to said communication device; and an initial power source level upon connection to the network.

3. The method of claim 1, wherein said communication device is a battery operated remote sensor and said network is a wireless network.

4. The method of claim 3, wherein said network is a non-wireless network.

5. The method of claim 1, wherein said communication device is a wireless mobile terminal and said network is a wireless network.

6. The method of claim 5, wherein said traffic is voice traffic and a voice call is begun on said mobile terminal at a first quality of service level according to an initially determined power level and power drain rate of said mobile terminal battery, and said voice call is continued at a second quality of service level according to a subsequently determined power level and power drain rate of said mobile terminal battery.

7. The method of claim 5, wherein a video message is presented for transfer and the audio portion of the message is transferred but the video portion is redirected to a predetermined address and a message is sent to inform a recipient of said audio the location of said video portion.

8. The method of claim 1, wherein said data comprises a Multimedia Messaging Service (MMS) message.

9. The method of claim 1, wherein said data comprises a video message.

10. The method of claim 1, wherein said communication device is a wireless modem.

11. The method of claim 1, wherein said communication device is a cordless phone system and said network is a public switched telephone network (PSTN).

12. The method of claim 1, wherein said communication device is a personal digital assistant and connects to a PSTN by wirelessly connecting to a computer connected to said PSTN.

13. An apparatus for managing traffic in a network involving a communication device with a limited power supply, the apparatus comprising:
a transceiver for receiving and transmitting data;
a controller for monitoring a current power level of said power supply and a power drain rate of said communication device, wherein said controller includes means for:
receiving all of said data;
redirecting said data to a predetermined location; and
based on the current power level, receiving a portion of said data and directing the remainder of said data to a predetermined address; and
means coupled to said power supply for determining said power drain rate of said communication device;

signal means for signaling said communication device to receive or transmit data according to said current power level and said power drain rate, wherein a quality of service level provided to the communication device in the network is changed in response to said power level calculations, wherein if said current power level and said power drain rate are sufficient to transfer said quantity of data, said controller commencing the transfer of said quantity of data and if said current power level and said power drain rate are not sufficient, said controller transferring a portion of said quantity of data to the communication device and transferring the remainder of said quantity of data to a predetermined destination, the address of which is sent to the communication device for retrieving the remainder of said quantity of data.

14. The apparatus of claim 13, further characterized by:
a database for storing initial parameters for said power supply of said communication device and periodically updating said power supply parameters, wherein said parameters include:
a drain rate for each communication service available to said communication device; and
an initial power source level upon connection to the network.

15. The apparatus of claim 13, wherein said communication device is a battery operated remote sensor and said network is a wireless network.

16. The apparatus of claim 15, wherein said network is a non-wireless network.

17. The apparatus of claim 13, wherein said communication device is a wireless mobile terminal and said network is a wireless network.

18. The apparatus of claim 17, wherein said traffic is voice traffic and a voice call is begun by said wireless mobile terminal at a first quality of service level according to an initially determined power level and power drain rate of a battery for said wireless terminal and said voice call is continued at a second quality of service level according to a subsequently determined power level and power drain rate of said battery.

19. The apparatus of claim 13, wherein a video message is presented for transfer and the audio portion of the message is transferred but the video portion is redirected to a predetermined address and a message is sent to inform a recipient of said audio the location of said video portion.

20. The apparatus of claim 13, wherein said communication device is a wireless modem.

21. The apparatus of claim 13, wherein said communication device is a cordless phone system and said network is a public switched telephone network (PSTN).

22. The apparatus of claim 13, wherein said communication device is a personal digital assistant and connects to a PSTN by wirelessly connecting to a computer connected to said PSTN.

23. The apparatus of claim 13, wherein said means for determining said power drain rate further comprises periodically determining said power drain rate associated with said communication device when said communication device changes location during data transmission.

24. The method of claim 1, wherein the step of determining a current power drain rate of said power source further comprises the step of periodically determining said drain rate when said communication device changes location during data transmission.

\* \* \* \* \*

UNITED STATES PATENT AND TRADEMARK OFFICE
CERTIFICATE OF CORRECTION

PATENT NO. : 7,657,273 B2
APPLICATION NO. : 10/550840
DATED : February 2, 2010
INVENTOR(S) : Haartsen It is certified that error appears in the above-identified patent and that said Letters Patent is hereby corrected as shown below:

In Column 2, Line 36, delete "lil<ely" and insert -- likely --, therefor.

In Column 11, Line 11, in Claim 2, delete "comprising:" and insert -- characterized by: --, therefor.

Signed and Sealed this

Thirteenth Day of July, 2010

David J. Kappos
*Director of the United States Patent and Trademark Office*